(12) United States Patent
Raible

(10) Patent No.: US 10,695,929 B2
(45) Date of Patent: Jun. 30, 2020

(54) BLADE FOR A STRIPPING AND CUTTING TOOL

(71) Applicant: Georg Fischer Rohrleitungssysteme AG, Schaffhausen (CH)

(72) Inventor: Moritz Raible, Ueberlingen (DE)

(73) Assignee: Georg Fischer Rohrleitungssysteme AG (CH)

( * ) Notice: Subject to any disclaimer, the term of this patent is extended or adjusted under 35 U.S.C. 154(b) by 0 days.

(21) Appl. No.: 16/263,115

(22) Filed: Jan. 31, 2019

(65) Prior Publication Data
US 2019/0240855 A1   Aug. 8, 2019

(30) Foreign Application Priority Data

Feb. 6, 2018   (EP) .................................... 18155222

(51) Int. Cl.
| | | |
|---|---|---|
| *B26D 3/28* | (2006.01) | |
| *B23B 5/16* | (2006.01) | |
| *B26D 3/00* | (2006.01) | |
| *B26D 1/00* | (2006.01) | |
| *B26D 1/04* | (2006.01) | |

(52) U.S. Cl.
CPC ............... *B26D 3/28* (2013.01); *B23B 5/162* (2013.01); *B26D 1/0006* (2013.01); *B26D 1/04* (2013.01); *B26D 3/001* (2013.01); *B26D 3/282* (2013.01); *B23B 2220/40* (2013.01); *B26D 2001/006* (2013.01); *B26D 2001/0053* (2013.01)

(58) Field of Classification Search
CPC ... B23B 2220/40; B23B 5/162; B26D 1/0006; B26D 1/04; B26D 2001/0053; B26D 2001/006; B26D 3/001; B26D 3/28; B26D 3/282

USPC .................................................... 30/346, 349
See application file for complete search history.

(56) References Cited

U.S. PATENT DOCUMENTS

| | | | | |
|---|---|---|---|---|
| 2,641,944 A | * | 6/1953 | Laffoon | B25D 3/00 81/9.51 |
| 3,171,309 A | * | 3/1965 | Cloutier | B23B 5/162 82/128 |
| 3,354,762 A | * | 11/1967 | Wolff | B23B 5/168 82/128 |
| 3,965,570 A | * | 6/1976 | Kozulla | B26B 25/00 30/90.1 |
| 3,999,452 A | * | 12/1976 | Larsen | B23B 5/162 82/113 |
| 4,744,123 A | * | 5/1988 | Le Testu | B23B 5/162 15/104.04 |
| 5,246,315 A | * | 9/1993 | Hansson | B23B 5/12 407/114 |

(Continued)

FOREIGN PATENT DOCUMENTS

| | | |
|---|---|---|
| EP | 1787743 A1 | 5/2007 |
| EP | 3213890 A1 | 9/2017 |

(Continued)

*Primary Examiner* — Hwei-Siu C Payer
(74) *Attorney, Agent, or Firm* — Harness, Dickey & Pierce, P.L.C.

(57) ABSTRACT

A blade for a stripping and peeling tool for stripping and peeling a pre-insulated pipe. The blade comprises a main body having a cutting edge disposed on a longitudinal edge thereof, and an insert blade having an axle for mounting in the main body so that a cutting edge of the insert blade runs parallel to the cutting edge of the main body.

11 Claims, 3 Drawing Sheets

(56) References Cited

U.S. PATENT DOCUMENTS

| | | | | |
|---|---|---|---|---|
| 5,256,008 A | * | 10/1993 | Hansson | B23B 5/12 |
| | | | | 407/113 |
| 5,979,276 A | * | 11/1999 | Blais | B23B 5/168 |
| | | | | 82/1.11 |
| 6,698,321 B2 | * | 3/2004 | Oswald | B23B 5/168 |
| | | | | 82/113 |
| 10,035,194 B2 | * | 7/2018 | Hunnekuhl | B23D 21/006 |
| 2004/0006875 A1 | * | 1/2004 | Paggeot | B26B 9/00 |
| | | | | 30/169 |
| 2011/0041343 A1 | * | 2/2011 | Benson | B23B 3/26 |
| | | | | 30/97 |

FOREIGN PATENT DOCUMENTS

| | | | |
|---|---|---|---|
| GB | 2 365 811 A | * | 2/2002 |
| JP | H06-79501 A | | 3/1994 |

* cited by examiner

BLADE FOR A STRIPPING AND CUTTING TOOL

CROSS-REFERENCE TO RELATED APPLICATIONS

This application claims the benefit and priority to European Patent Application No. 18 155 222.5 filed Feb. 6, 2018. The entire disclosure of the above application is incorporated herein by reference.

BACKGROUND OF THE INVENTION

The invention relates to a blade for a stripping and peeling tool for stripping and peeling a pre-insulated pipe, including a main body, wherein the main body is configured as an elongate thin plate, wherein the plate is configured so as to be convex and the apex of the convex curvature extends along the length of the plate, wherein a cutting edge is disposed on a longitudinal edge of the plate, or of the main body, respectively, said cutting edge serving for releasing the insulation layer from an internal pipe, and an insert blade.

Peeling apparatuses for external shell faces of pipes so as to peel off the external oxidized layers in order for optimum welded connections to a fitting to be able to be carried out are mainly known from the prior art. In order for the welded connection to withstand the necessary requirements, and since the latter are achievable only when the external shell face does not have any contaminations and any oxide layer, it is important for the outermost layer to be removed. JP 6-79501 discloses such a peeling tool for peeling off the external shell face of a pipe.

Stripping apparatuses for stripping a metal pipe that is provided with a protective layer are also known from the prior art. EP 1 118 405 A1 discloses such an apparatus.

However, both devices mentioned above are not suitable for stripping and peeling a pre-insulated pipe which typically includes a somewhat thicker foam insulation which has to be separated from the internal pipe, and the external shell pipe face of the internal pipe subsequently has to be reworked in such a manner that the surface is suitable for welding. Such pre-insulated pipelines are used where a positive insulation of the medium in relation to the environmental conditions is required, for example for conveying coolant media in cooling systems. An insulation layer, preferably from foamed plastics material, is disposed about the medium-conveying internal pipe, or the medium pipe, preferably from plastics material, wherein the insulation layer is surrounded by an external skin or an external pipe which are preferably formed from plastics material or else from a metal and serve as protection of the insulation layer. Such pipelines at the ends thereof have to be stripped, and the medium pipe has to be peeled on the external shell face so as to be able to be connected to fittings or further pipes, since the connection by way of the medium pipe is performed so as to guarantee the tightness.

EP 3 213 890 A1 discloses a tool by way of which stripping and peeling a pre-insulated pipe is possible. The blade used enables both stripping by separating the insulation layer, as well as peeling the external shell face of the internal pipe. However, it is disadvantageous in the embodiment mentioned above that the blade, or the cutting edges disposed thereon, respectively, are rigidly aligned and cannot adapt to the external shell face of the internal pipe.

It is an aspect of the invention to propose a blade which is suitable for stripping and peeling pre-insulated pipe ends and guarantees optimal peeling of the external shell face, and enables an optimal process in terms of economy by way of which the procedure can be carried out in an efficient manner.

This aspect is achieved according to the invention in that the insert blade is configured as a separate part and the blade includes an axle, wherein the axle serves for mounting the insert blade in the main body and preferably protrudes through the insert blade, wherein the insert blade has a cutting edge and the insert blade is disposed in the main body in such a manner that the cutting edge of the insert blade runs parallel to the cutting blade on the main body.

The blade according to the invention for stripping and peeling a pre-insulated pipe includes an main body, wherein the main body is configured as an elongate thin plate. The plate across the complete length has a convex design embodiment, that is to say that the plate on the internal side thereof which is directed toward the internal pipe, as also on the external side, has a curvature, preferably on a radius, wherein the two curvatures, preferably radii, preferably run so as to be concentric. On account of the convex design embodiment of the plate, the apex of the curvature, preferably radius, extends along the length of the plate, or of the main body, respectively. A cutting blade is disposed on the longitudinal edge of the main body, or of the plate, respectively, wherein the cutting blade serves for releasing the insulation layer from the internal pipe. In order for the insulation layer to be released, the blade is rotated to the one side, or in the one rotation direction, respectively, and subsequent peeling is preferably carried out by means of a rotation in the opposite direction, wherein peeling can also be performed during the rotation or the release of the insulation layer, respectively.

The blade includes an insert blade which is configured as a separate part and is disposed in the main body. The insert blade by means of an axle which protrudes through the insert blade is mounted in the main body, on account of which the insert blade has the possibility of moving upwards and downwards and is guided on the left and the right of the main body.

The cutting edge that is disposed on the insert blade is aligned so as to be parallel to the cutting edge on the main body, wherein said insert blade is aligned in the opposite direction of the same direction as the cutting edge on the main body. On account of the mutually opposing, or opposite alignment, respectively, of the two cutting edges it is achieved that the release of the insulation layer from the internal pipe is performed while the blade is being driven inwards in the one rotation direction, that is to say in or counter to the clockwise direction, and the subsequent peeling is then performed while the blade is driven outwards and in the opposite rotation direction. However, when the cutting edges on the blade, or on the main body, respectively, and on the insert blade are aligned in the same direction, the peeling of the internal pipe is performed during the release of the insulation layer, thus also while the blade is driven inwards. On account thereof, unnecessary movement procedures during the process can be avoided in both cases, on account of which the procedure can be carried out in an efficient manner.

The main body preferably has a recess in which the insert blade is disposed. The insert blade is guided and aligned in an optimal manner on account of the insert blade being disposed in the recess.

It is advantageous that the recess in the main body is configured so as to be continuous and is completely enclosed by the main body. This means that the recess completely penetrates the main body, or the plate, respectively, and is surrounded by the main body on all sides such that the main body frames the recess. This is associated with the advantage that the main body is inherently stable and does not have any protrusions or corners which project separately and catch on the insulation layer.

According to one preferred embodiment the blade has a spring element which serves for pressing on the insert blade. Since the insert blade is mounted on the axle, the insert blade has the possibility of moving downwards and upwards so as to adapt to the external shell face of the internal pipe. In order to now exert a certain pre-tensioning on the insert blade, or so as to achieve a force for peeling the external shell face, respectively, the spring element presses the insert blade downwards, or against the internal pipe, respectively. The insulation layer which runs above the blade likewise exerts a contact pressure force on the blade, said contact pressure force serving the peeling procedure.

The invention is also distinguished in that the main body has a thickness of only 1 to 4 mm, particularly preferably of 1.5 to 3 mm; the piercing of the insulation layer is enabled on account thereof. It is moreover advantageous when the main body on the two longitudinal sides and preferably on the end side has an incline. The inclines on the longitudinal sides enable the insulation to better slide across the blade, and the incline on the end side minimize the resistance when piercing the insulation layer.

It has proven advantageous when the cutting edge on the main body extends across the complete length of the main body; this enables the insulation layer to be separated from the internal pipe in a simple manner.

The insert blade preferably has a gradation of the thickness, or of dissimilar heights, respectively, across the length of the insert blade. The internal face of the insert blade faces the internal pipe to be peeled and has dissimilar heights. This serves for the cutting blade coming into contact with the external shell face even when the rear region, or the clearance region, respectively, of the insert blade in the peeling procedure at first runs across the as yet unpeeled external shell face which has an even larger diameter than the finally peeled diameter. It is ensured on account of the height differentials that the cutting edge, or the peeling region, respectively, of the insert blade nevertheless can engage in the shell face to a sufficient depth so as to subtract material, since the cutting edge is configured so as to be higher than the rear region of the blade, said rear region serving as the clearance region and bearing on the external shell face only once deeper peeling is no longer desired. The peeling region preferably protrudes beyond the clearance region by between 0.2 to 0.8 mm, particularly preferably 0.2 to 0.5 mm in terms of the height on the internal face of the insert blade.

SUMMARY OF THE INVENTION

It is advantageous when the insert blade on the internal face has dissimilar regions which preferably have dissimilar heights. The regions serve different purposes, as has been mentioned above. The insert blade has a peeling region on which the cutting edge is disposed, on the one hand, and at least one clearance region which is disposed behind the peeling region, on the other hand. In terms of the height, the peeling region, or the cutting edge, respectively, protrudes beyond the clearance region so as to ensure peeling.

It has proven advantageous when a bearing region which is preferably disposed in front of the peeling region, or in front of the cutting edge, respectively, is disposed on the insert blade. This means that the insert blade, preferably in the front region, has a bearing region for supporting the insert blade at the end of the peeling procedure, or when the driving out of the blade has been terminated. It is avoided on account thereof that the cutting edge at the pipe end digs into the shell face, the peeling instead petering out in a straight manner.

One preferred embodiment lies in that the cutting edge on the main body and the cutting edge on the insert blade run parallel to the pipe axis of the pipe to be stripped; this enables simple stripping and peeling by way of one tool in one clamping.

All potential design embodiments are capable of being freely combined with one another.

An exemplary embodiment of the invention will be described by means of the figures, wherein the invention is not limited only to the exemplary embodiment. In the figures:

DETAILED DESCRIPTION OF THE PREFERRED EMBODIMENTS

Figure 1:
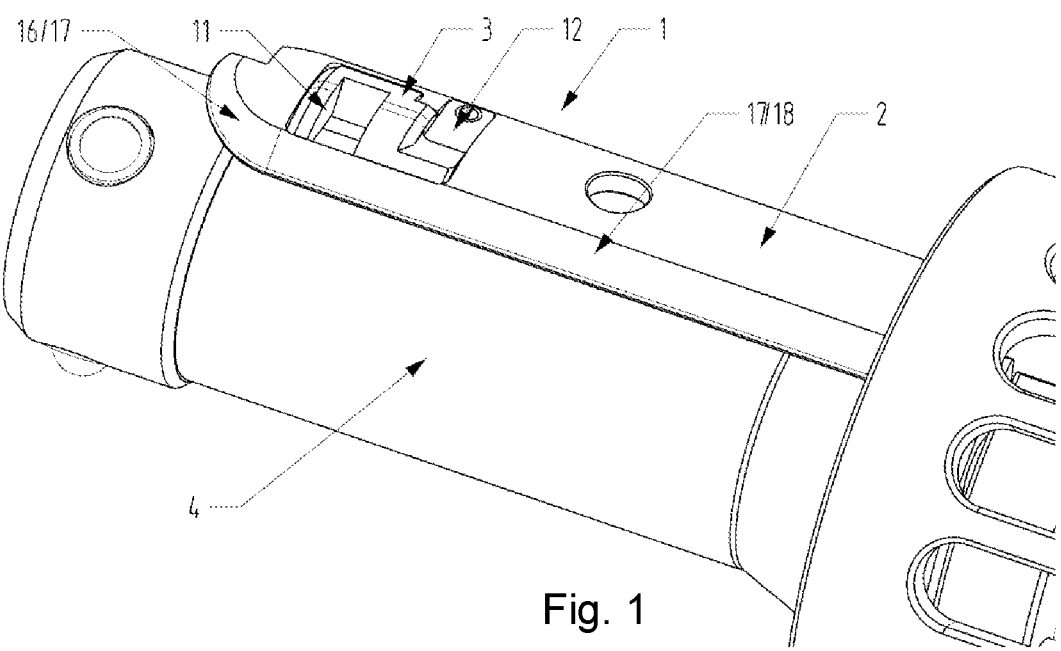
FIG. 1 shows a three-dimensional view of a blade according to the invention, wherein the blade is installed in a corresponding stripping and peeling tool.
Figure 2:
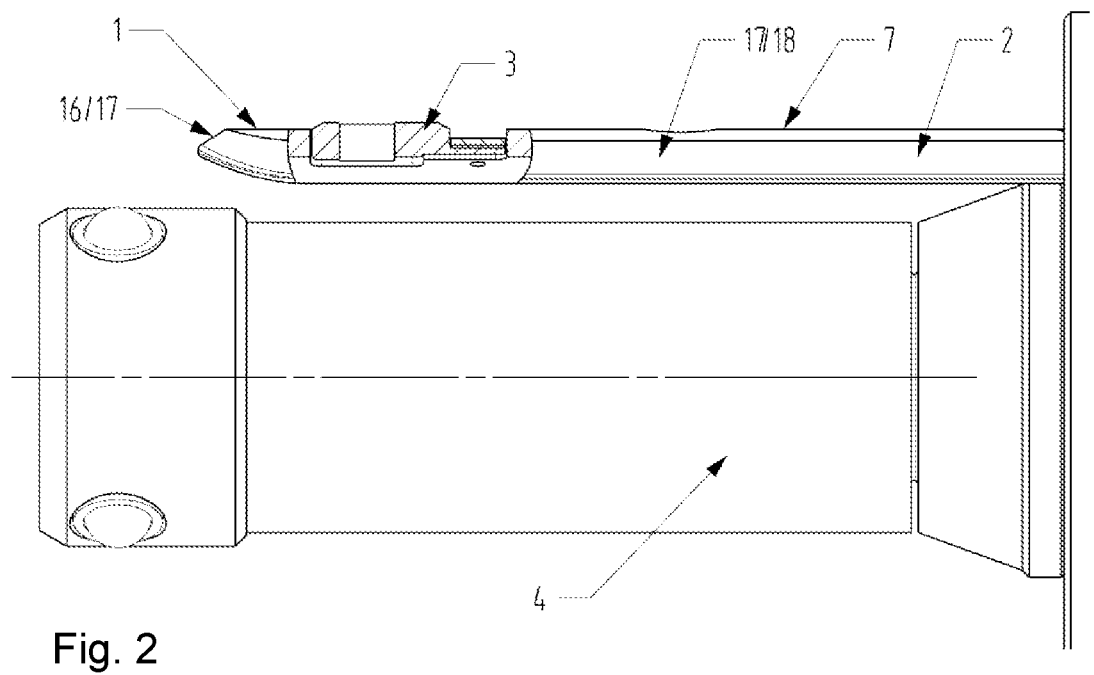
FIG. 2 shows a lateral view of a blade according to the invention, wherein the blade is installed in a corresponding stripping and peeling tool.

The embodiment illustrated in FIGS. 1 to 6 shows a blade 1 in which the cutting edges 8, 10 are aligned counter to one another. Of course, the explanations are also to be applied to a blade 1 having identically directed cutting edges 8, 10. The drawing illustrated in FIG. 1 shows the blade 1 according to the invention in a corresponding tool for stripping and peeling pre-insulated pipelines. The pipe to be stripped is placed onto the receiving mandrel 4 and the blade 1 according to the invention by way of a rotating movement is then driven into the insulation layer of the pre-insulated pipeline. FIGS. 1 and 2 shown here show the blade 1 in the position in which said blade 1 is completely plunged into the pipe, wherein the pipe is not illustrated here so as to show the blade in a readily visible manner. At the beginning of the process, the blade 1 does not yet protrude beyond the receiving mandrel 4 but by way of the rotating movement slowly rises up to the position illustrated. The blade 1 includes a main body 2 which is preferably produced from a metallic material. The main body 2 has a shape of an elongate thin plate which has a convex curvature. The convex curvature on the external side 5 can be readily seen in FIGS. 4 and 5. The curvature 5 which is preferably configured as a radius is associated with the advantage that the separated insulation layer slides easily across the blade 1 while said blade 1 further penetrates the insulation layer, as is also the case when the blade 1 is driven outwards during the peeling procedure. As has already been mentioned, the peeling procedure in the alternative embodiment having the identically directed cutting edges 8, 10 is likewise carried out during the inward driving. A convex curvature 6 which is likewise preferably configured as a radius is likewise disposed on the internal side of the main body 2, on account of which the blade 1, or the main body 2, respectively, bears well on the external shell face of the internal pipe, good stripping as well as peeling thus being able to be performed. The apex 7 of the convex curvature 5 runs parallel to the length of the main body 2, or of the plate, respectively. A cutting edge 8 which serves for stripping or releasing, respectively, the insulation layer from the external shell face of the internal pipe (not illustrated) extends on a longitudinal edge of the main body 2. The cutting edge 8 preferably extends along the complete length of the main body 2.

Figure 6A:
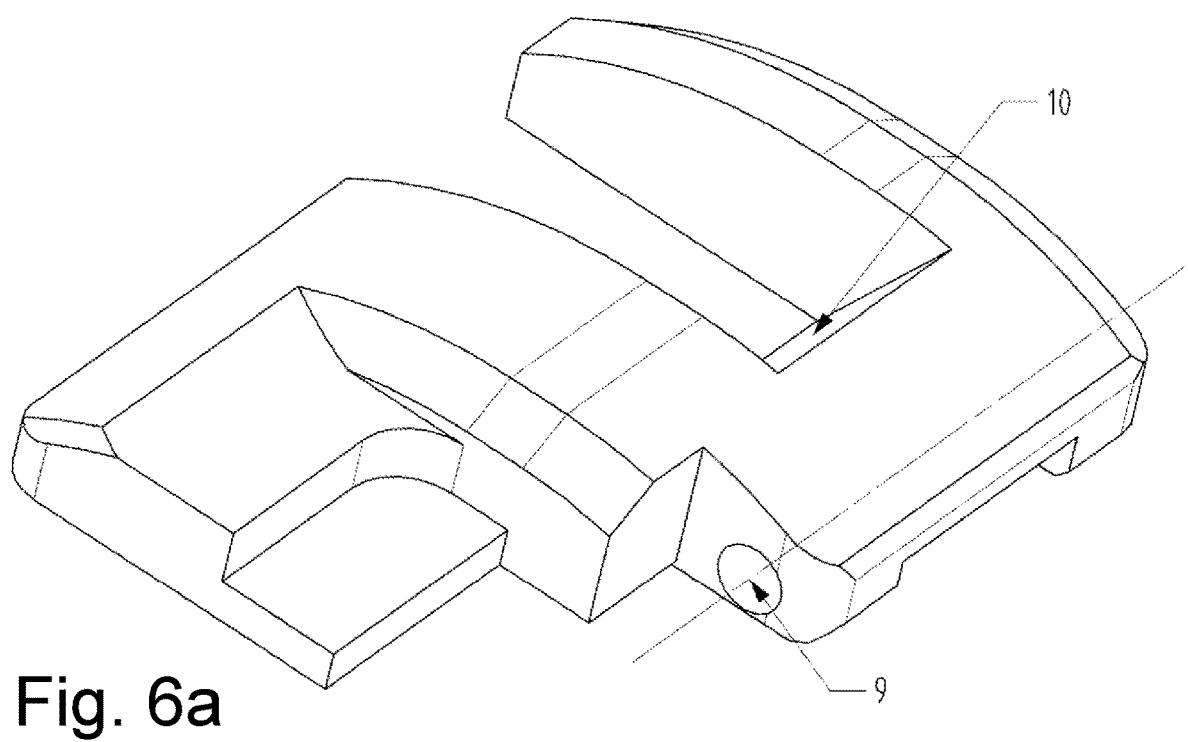
FIG. 6*a* FIG. 6*b* are two three-dimensional views of an insert blade.
Figure 6B:
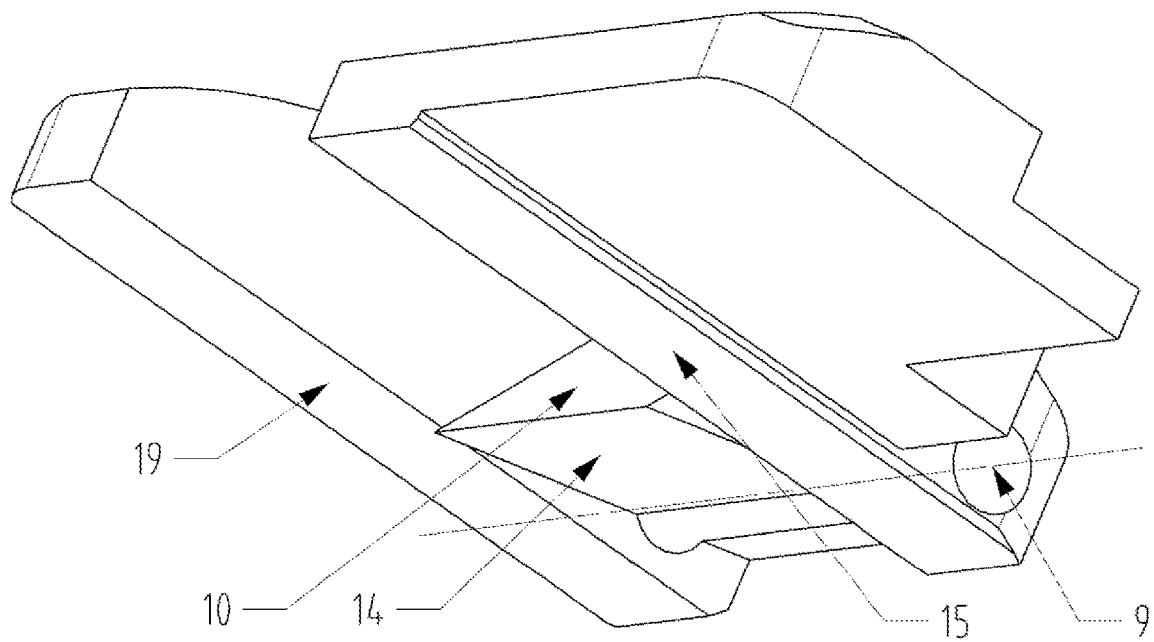

The blade 1 includes an insert blade 3, wherein the latter is configured as a separate part, as can be readily seen in FIG. 6. The insert blade 3 by means of an axle 9 is disposed or mounted, respectively, in the main body 2. The axle 9 protrudes through the insert blade 3 and, on account thereof, enables a pivoting downwards and upwards movement of the insert blade 3 so as to readily adapt to the external shell face of the internal pipe during the peeling procedure. The insert blade 3 has a cutting edge 10 which serves for peeling the external shell face of the internal pipe. The insert blade 3 is disposed in the main body 2 in such a manner that the cutting edge 10 of the insert blade 3 runs parallel to the cutting edge 8 on the main body 2, and the cutting edge 10 of the insert blade 3 is aligned in the opposite direction or the same direction as the cutting edge 8 on the main body 2. The cutting edges 8, 10 disposed in an opposing manner arise because the stripping, or the separating, respectively, of the insulation layer from the internal pipe is performed in the one rotation direction, and the subsequent peeling is performed in the other rotation direction, on account of which the blade 1 is screwed out of the pipe again. In the case of identically directed cutting edges 8, 10 the peeling is performed while stripping, thus during the same rotating procedure, consequently during the inward driving.

The main body 2 has a recess 11 in which the insert blade 3 is disposed. The recess 11 is configured so as to be continuous in order for the insert blade 3 disposed therein to protrude therethrough and to be able to contact the external shell face of the internal pipe. The recess 11 in the embodiment depicted is moreover completely surrounded by the main body 2, that is to say that said recess 11 is not open on any side and is thus completely framed by the main body 2, on account of which the complete main body 2 has a high stability and rigidity and also has no projecting elements which could catch on the insulation. In order for positive peeling of the internal pipe to be guaranteed, and apart from the insulation layer likewise pressing onto the insert blade 3 while said insulation layer during the peeling procedure slides across the main body 2 when the blade is driven outwards, the insert blade 3, preferably by means of a spring element 12, is additionally pressed downwards.

The incline 17 which runs along the longitudinal edges 8, 18 as well as on the end side 16 of the main body 2, enables the blade 1 to pierce the insulation layer in a simpler manner since the resistance is reduced on account of the former, just as the stripping and peeling procedure by virtue of the incline 17 enables the insulation layer to slide across the blade 1 in a simple manner.

Figure 3:
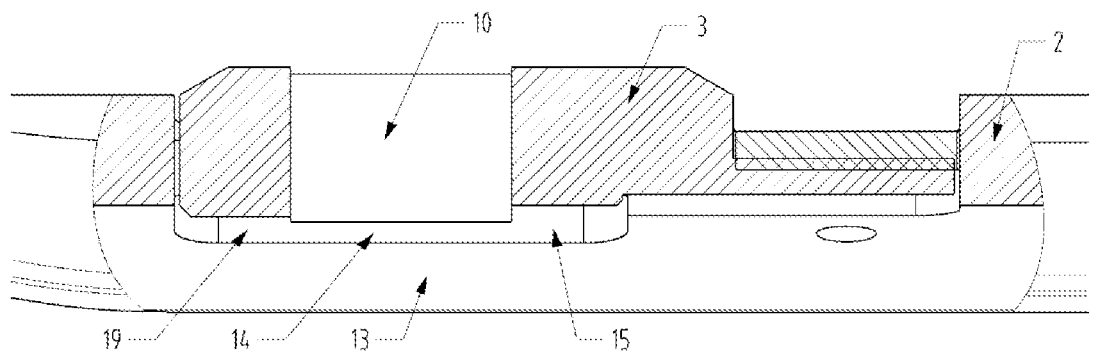
FIG. 3 shows a longitudinal section through an insert blade that is inserted in the main body.
Figure 4:
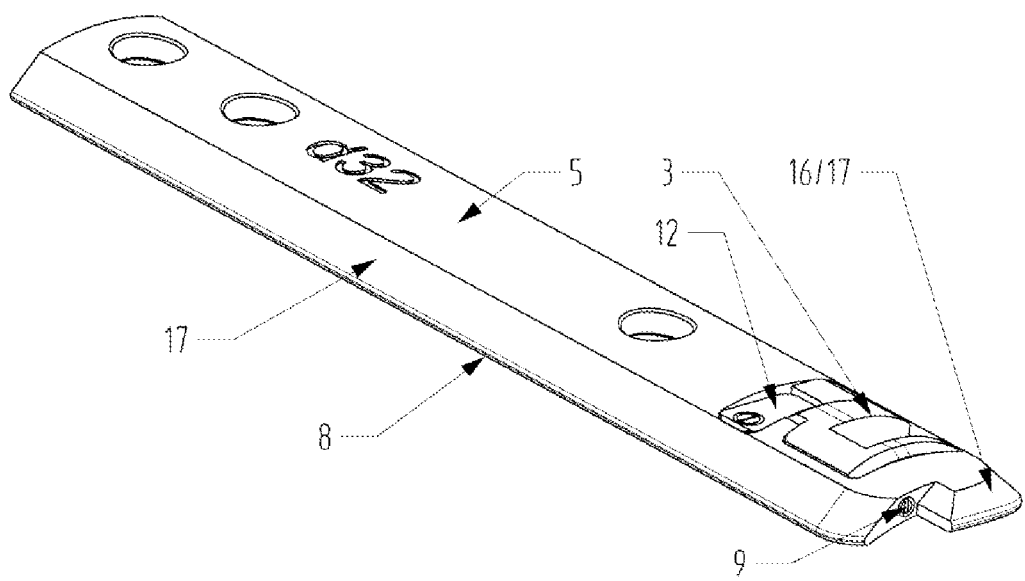
FIG. 4 shows a three-dimensional view of a blade according to the invention.

The insert blade 3 on the internal face 13 thereof which faces the internal pipe to be peeled has a height gradation; the latter can be readily seen in FIG. 3. The peeling region in the case of the cutting edge 10 is configured so as to be higher than the clearance region 15 lying therebehind, or else the bearing region 19 lying therebefore. Since the internal pipe is peeled while the blade 1 is being driven outwards, the clearance region 15 is in each case located above the unpeeled pipe, the latter thus having a larger external diameter. In order for an engagement of the insert blade 3 by way of the cutting edge 10 in the peeling region 14 to be guaranteed, the clearance region 15 has a lower height than the peeling region 13. The insert blade 3 ahead of the peeling region 13 preferably has a bearing region 19 which prevents the peeling region 14, or the cutting edge 10, respectively, digging into the pipe at the end of the pipe since there is no longer any bearing potential by way of the clearance region 15, since the latter is already located outside the pipe.

Figure 5:
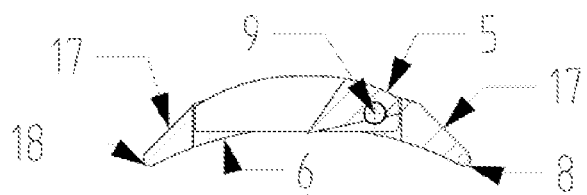
FIG. 5 shows a cross-section through an insert blade that is inserted in the main body.

It can be readily seen in FIG. 5 how the insert blade 3 is mounted on the axle 9 in the main body 2. The main body 2 preferably has a detent which delimits the downward rotating movement of the insert blade 3, wherein the detent is not illustrated in the figures.

What is claimed is:

1. A blade for a stripping and peeling tool for stripping and peeling a pre-insulated pipe, comprising a main body, wherein the main body is configured as an elongate plate, wherein the plate is configured so as to have a convex curvature and an apex of the convex curvature extends along the length of the plate, wherein a cutting edge is disposed on a longitudinal edge of the plate, or of the main body said cutting edge serving for releasing an insulation layer from the pre-insulated pipe, and an insert blade, wherein the insert blade is configured as a separate part and the blade includes an axle, wherein the axle serves for mounting the insert blade in the main body and protrudes through the insert blade, wherein the insert blade has a cutting edge and the insert blade is disposed in the main body in such a manner that the cutting edge of the insert blade runs parallel to the cutting edge on the main body.

2. A blade according to claim 1, wherein the cutting edge of the insert blade is aligned in the opposite direction or the same direction as the cutting edge on the main body.

3. A blade according to claim 1, wherein the main body has a recess in which the insert blade is disposed.

4. A blade according to claim 1, wherein the main body has a recess, wherein the recess is configured so as to be continuous and is completely enclosed by the main body.

5. A blade according to claim 1, wherein the blade has a spring element which serves for pressing on the insert blade.

6. A blade according to claim 1, wherein the main body has a thickness of 1 to 4 mm.

7. A blade according to claim 1, wherein the cutting edge on the main body extends along the complete length of the main body.

8. A blade according to claim 1, wherein the insert blade has an internal face with a gradation of the height along the length of the insert blade.

9. A blade according to claim 8, wherein the insert blade on the internal face has dissimilar regions which have dissimilar heights.

10. A blade according to claim 1, wherein the insert blade has a peeling region and at least one clearance region, wherein the regions are disposed behind one another.

11. A blade according to claim 1, wherein the cutting edge on the main body and the cutting edge on the insert blade run in a longitudinal direction of the blade.

* * * * *